W. A. RUSH.
BEET TOPPING MACHINE.
APPLICATION FILED APR. 26, 1917.
1,258,818.
Patented Mar. 12, 1918.
2 SHEETS—SHEET 1.
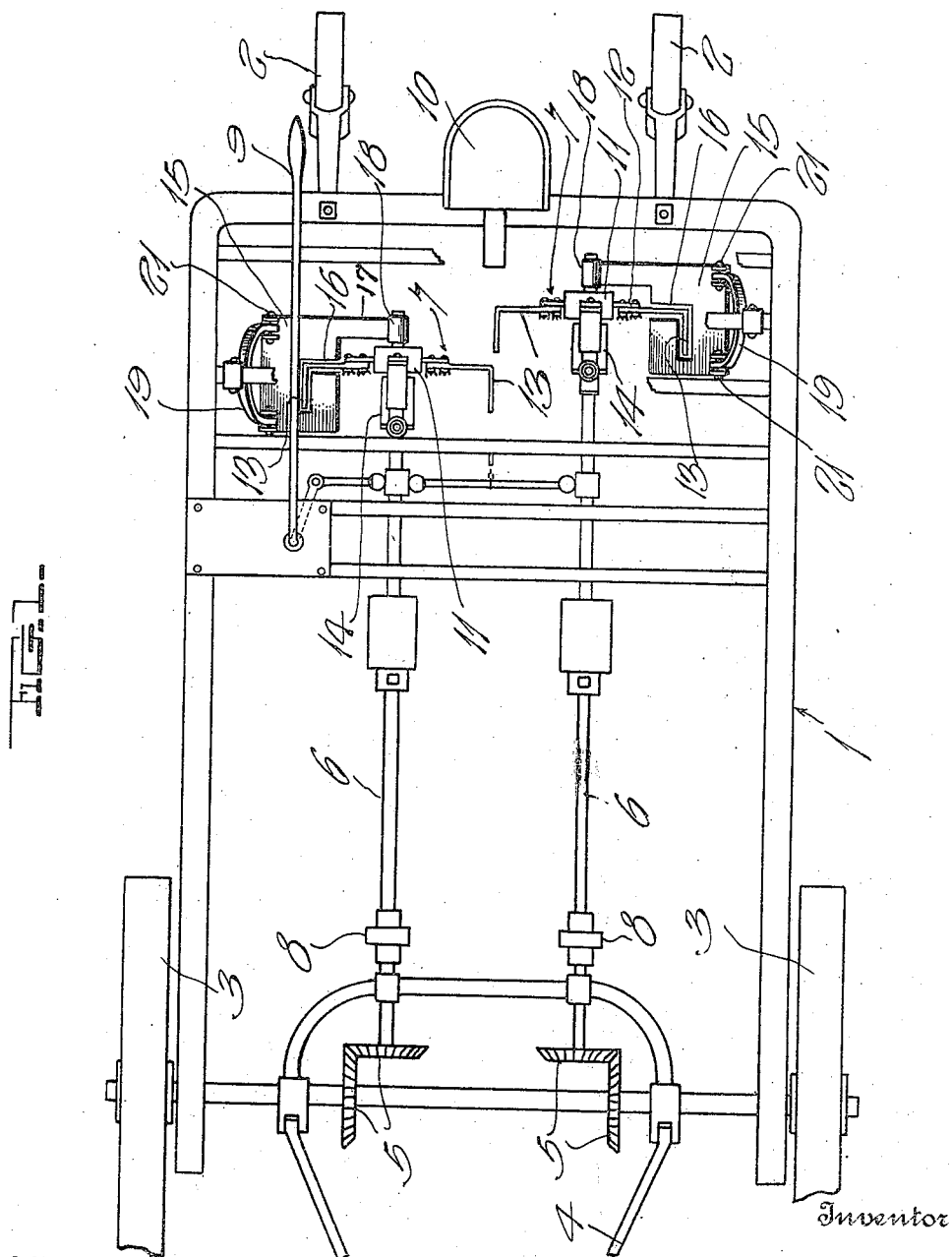
Witness
H. Woodard
Inventor
W. A. Rush
By H. A. Wilson & Co.
Attorneys

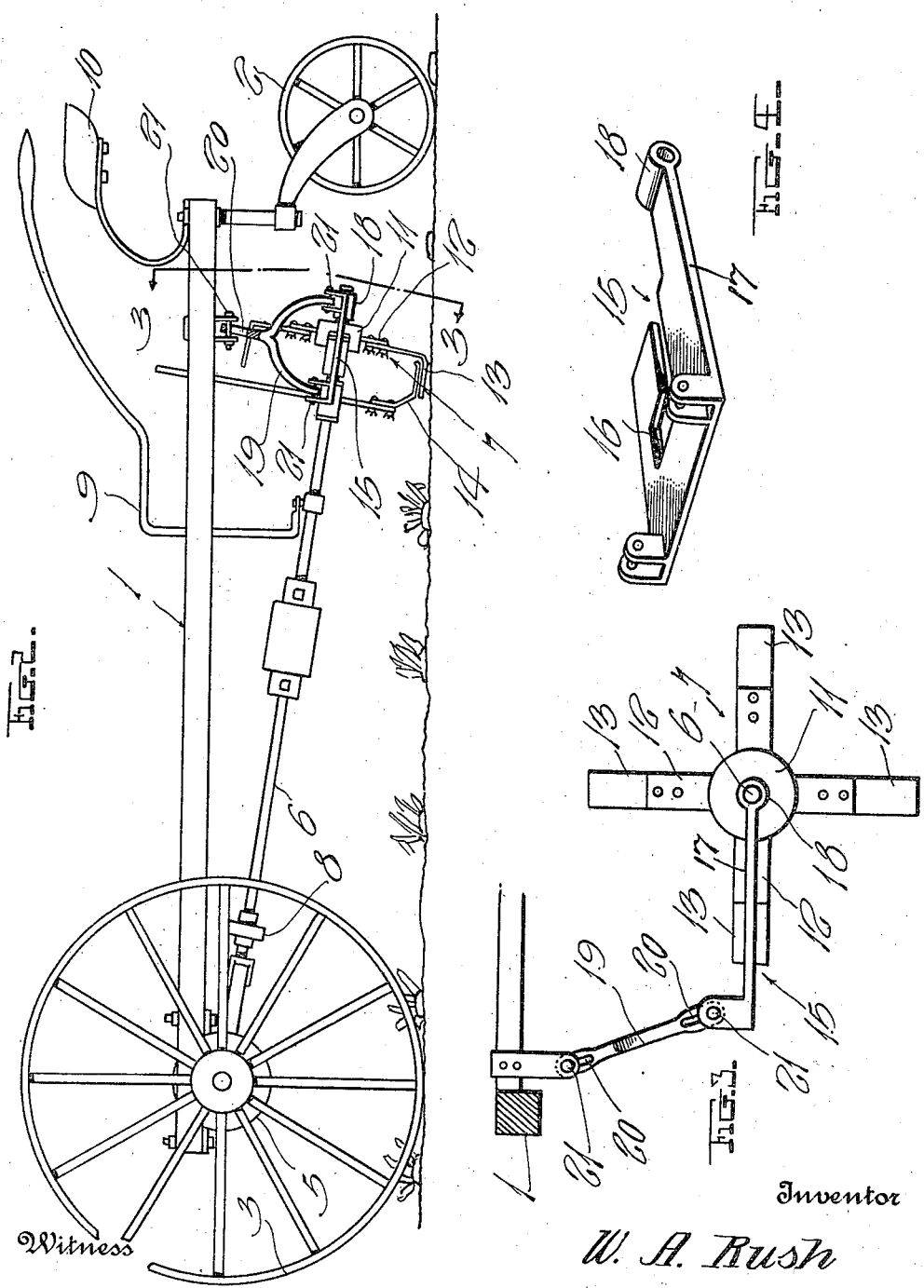

UNITED STATES PATENT OFFICE.

WEAVER A. RUSH, OF LOGAN, UTAH.

BEET-TOPPING MACHINE.

1,258,818.   Specification of Letters Patent.   Patented Mar. 12, 1918.

Application filed April 26, 1917.   Serial No. 164,713.

*To all whom it may concern:*

Be it known that I, WEAVER A. RUSH, a citizen of the United States, residing at Logan, in the county of Cache and State of Utah, have invented certain new and useful Improvements in Beet-Topping Machines; and I do declare the following to be a full, clear, and exact description of the invention, such as will enable others skilled in the art to which it appertains to make and use the same.

My invention relates to that class of beet topping machines disclosed in my pending U. S. application, Serial No. 141,235, filed on or about January 8, 1917.

In the operation of the machine shown in the application above referred to, it was found that beet tops, weeds, and the like were prone to accumulate on the rotary beet topping cutters, and the present invention therefore aims to provide an efficient type of guard through which these cutters pass in such a manner that any beet tops or other vegetation will be removed therefrom.

With the foregoing general object in view, the invention resides in the novel features of construction and unique combinations of parts to be hereinafter fully described and claimed, the descriptive matter being supplemented by the accompanying drawings which form a part of this specification and in which:

Figure 1 is a top plan view of a beet topping machine constructed in accordance with my invention;

Fig. 2 is a side elevation thereof;

Fig. 3 is a vertical transverse section on the plane of the line 3—3 of Fig. 2; and Fig. 4 is a perspective view of one of the improved guards.

In the drawings above briefly described, the numeral 1 designates a suitable frame supported on front and rear wheels 3 and 2 and having any suitable draft appliance 4 for drawing it across a field. Beveled gears 5 drive one or more longitudinal shafts 6 from the front axle which is in turn driven by the wheels 3, said shafts having rotary beet topping cutters 7 on their rear ends and universal joints 8 adjacent their front ends for permitting lateral swinging of said shafts so that by means of a lever 9 adjacent the driver's seat 10, the cutters may be maintained in proper relation to the rows of beets even though the same are not planted in truly straight lines.

Each cutter 7 includes a hub 11 keyed on its respective shafts 6, arms 12 radiating from said hub and preferably formed in detachably connected sections, and beet topping knives 13 extending from the outer ends of said arms at substantially right angles thereto. The knives 13 operate beneath a shoe 14 adapted to space them at the proper distance below the extreme upper end of the beet body for properly severing the tops therefrom. For the details of construction employed in mounting the shoes 14, reference may be had to the pending application above mentioned.

To prevent the accumulation of beet tops and the like on the rotary cutters, guards 15 are provided, said guards being of any suitable construction, although they are preferably formed substantially as shown in the drawings, that is, of horizontal flat plates having L-shaped slots 16 through which the knives 13 and the adjacent portions of the arms 12 travel as the cutters rotate, said plates being supported at their inner ends from the projecting rear ends of the shafts 6 by means of arms 17 extending from said plates and having bearings 18 mounted on said shafts. The outer ends of the guards 15 are swingingly supported by links 19 from the frame 1 and it will thus be obvious that the guards may move laterally with the cutters as the latter are shifted by the lever 9. In order to permit the links 19 to move in the required manner as the shafts 7 are raised and lowered, it is necessary that the pivotal connections of said links with the frame and the guards 15 be allowed an appreciable amount of loose movement, and although this could well be done in a number of ways, the ends of said links are preferably formed with vertically elongated slots 20 through which bolts or rivets 21 pass loosely to serve as pivots.

By constructing the improved guards as or substantially as shown and described, they will prevent weeds, beet tops, and other vegetation from accumulating on the cutters 7, and thus the efficiency thereof will not be impaired. Since these advantages are derived best from the construction shown and described, this arrangement constitutes the preferred form of the machine, but it is to be understood that within the scope of the invention as claimed, numerous minor changes may be made without sacrificing the principal advantages.

I claim:

1. The combination with a beet topping machine having a laterally swinging rotary beet topping cutter; of a guard through which said cutter passes to prevent accumulation of tops or the like thereon, and means for supporting said guard for movement with said cutter when swinging laterally.

2. The combination with a beet topping machine having a laterally swinging rotary beet topping cutter; of a guard through which said cutter passes to prevent accumulation of tops or the like thereon, one end of said guard being supported by the shaft of the cutter, and a link swingingly supporting the other end of said guard.

3. The combination with a beet topping machine having a rotary cutter including radiating arms and beet topping knives extending at an angle therefrom; of a guard having an angular slot through which said knives and the adjacent portions of said arms travel dring the rotation of the cutter to prevent accumulation of tops and the like thereon.

In testimony whereof I have hereunto set my hand in the presence of two subscribing witnesses.

WEAVER A. RUSH.

Witnesses:
A. A. LAW,
L. E. NELSON.

Copies of this patent may be obtained for five cents each, by addressing the "Commissioner of Patents, Washington, D. C."